United States Patent [19]

Brand et al.

[11] Patent Number: 5,198,403

[45] Date of Patent: Mar. 30, 1993

[54] PROCESS FOR PRODUCING A CATALYST FOR SELECTIVE REDUCTION OF NITROUS OXIDES WITH AMMONIA

[75] Inventors: Reinhold Brand; Bernd Engler, both of Hanau; Wolfgang Honnen, Bruchkoebel; Edgar Koberstein, Alzenau; Johannes Ohmer, Bad Homburg, all of Fed. Rep. of Germany

[73] Assignee: Degussa AG, Frankfurt, Fed. Rep. of Germany

[21] Appl. No.: 787,746

[22] Filed: Nov. 5, 1991

Related U.S. Application Data

[63] Continuation of Ser. No. 484,405, Feb. 26, 1990, abandoned.

[30] Foreign Application Priority Data

Feb. 28, 1989 [DE] Fed. Rep. of Germany ....... 3906136

[51] Int. Cl.⁵ .................. B01J 37/04; B01J 21/06; B01J 21/02; B01J 21/04
[52] U.S. Cl. .................. 502/204; 502/312; 502/350; 502/206; 502/207; 502/202; 502/209; 502/210; 502/211; 502/213; 502/214; 502/208; 502/242; 502/309; 502/303; 502/304; 423/239
[58] Field of Search ............ 423/239; 502/309, 312, 502/350, 204, 206, 207, 202, 209, 210, 211, 213, 214, 208, 242, 303, 304

[56] References Cited

U.S. PATENT DOCUMENTS

| | | | |
|---|---|---|---|
| 4,003,978 | 1/1977 | Shiraishi et al. | 502/307 |
| 4,034,060 | 7/1977 | Koberstein et al. | 423/239 |
| 4,085,193 | 4/1978 | Nakajima et al. | 423/239 |
| 4,182,745 | 1/1980 | Nishida et al. | 423/239 |
| 4,207,209 | 6/1980 | Matsuda et al. | 502/309 X |
| 4,518,710 | 5/1985 | Brennan | 423/239 A X |
| 4,520,124 | 5/1985 | Abe et al. | 502/309 X |
| 4,571,329 | 2/1986 | Kato et al. | 423/239 |
| 4,812,296 | 3/1989 | Schmelz et al. | 423/239 |
| 4,851,381 | 7/1989 | Hums | 502/309 X |
| 4,859,439 | 8/1989 | Rikimaru et al. | 423/239 |
| 4,891,348 | 1/1990 | Imanari et al. | 423/239 X |
| 4,929,586 | 5/1990 | Hegedus et al. | 502/217 |
| 4,946,661 | 8/1990 | Tachi et al. | 423/239 |
| 4,966,882 | 10/1990 | Kato et al. | 502/309 |

FOREIGN PATENT DOCUMENTS

| | | |
|---|---|---|
| 2214604 | 10/1973 | Fed. Rep. of Germany . |
| 2458888 | 6/1975 | Fed. Rep. of Germany . |
| 3619337 | 12/1986 | Fed. Rep. of Germany . |
| 3531809 | 3/1987 | Fed. Rep. of Germany . |

OTHER PUBLICATIONS

Kirk-Othmer, Encyclopedia of Chemical Technology, 3rd ed., vol. 6, pp. 207–213.

Primary Examiner—W. J. Shine
Assistant Examiner—Douglas J. McGinty
Attorney, Agent, or Firm—Beveridge, DeGrandi, Weilacher & Young

[57] ABSTRACT

A catalyst for the selective reduction of nitrous oxide with ammonia contains, in addition to titanium oxide as component (A), at least one oxide of W, Si, B, Al, P, Zr, Ba, Y, La, Ce and at least one oxide of V, Nb, Mo, Fe, Cu as component (B), whereby the atomic ratio between the elements of components (A) and (B) amounts to 1:0.001 up to 1. The catalyst can be obtained by kneading reactive titanium oxide with a high specific surface of predominantly anatase with the substances of component (B) or their preliminary stages, adding processing agents, winding up with a homogeneous kneaded mass, extruding the latter, drying the extrudate and calcining in air at 300°–800° C.

14 Claims, 3 Drawing Sheets

PROCESS FOR PRODUCING A CATALYST FOR SELECTIVE REDUCTION OF NITROUS OXIDES WITH AMMONIA

This application is a continuation of U.S. patent application Ser. No. 07/484,405, filed Feb. 26, 1990, now abandoned, which application is incorporated entirely herein by reference.

INTRODUCTION AND BACKGROUND

The present invention relates to catalysts for selective reduction of nitrous oxides with ammonia and methods of use thereof.

Nitrous oxides, which originate during combustion processes, are among the main causes of acid rain or photo smog and the attendant environmental damage. In particular, nitrous oxides, along with fluorochlorohydrocarbons, are suspected of being responsible for the observed shrinkage of the ozone layer above the polar regions.

Sources of nitrous oxide emission are motor vehicle traffic, stationary combustion motors, power plants, thermal power stations, steam generators for industrial purposes, and industrial production facilities.

In power plants with boiler furnaces, of course, one can achieve a reduction in the nitrous oxide concentration in the waste gas by using very pure fuels or by means of optimization of the combustion systems. These are referred to as primary measures. However, these furnace-engineering measures encounter both technical and economic limitations. This is why additional secondary measures must be taken to comply with the legally prescribed emission limitation values. Such secondary measures to reduce nitrous oxides usually involve catalytic reduction methods, in which connection one uses mostly ammonia as the selectively acting reduction agent.

Many catalysts are already known for reductive catalytic lowering of nitrous oxide emissions. For example, German Patent Applications 12 59 298, 12 53 685, and 11 15 230 describe oxidic catalysts without noble metal, while German OLS 22 14 604 describes oxidic catalysts that contain noble metals.

German Patent 24 58 888 describes another catalyst which consists of an "intimate mixture" of the following components:
(A) titanium in the form of oxides;
(B) at least one metal from the following group: B-1 iron and vanadium in the form of oxides and/or the group B-2 molybdenum, tungsten, nickel, cobalt, copper, chrome and uranium in the form of oxides;
(C) tin in the form of oxides;
(D) metals from the group of beryllium, magnesium, zinc, boron, aluminum, yttrium, rare earth elements, silicon, niobium, antimony, bismuth, and manganese in the form of oxides.

The components are present in the following atomic ratios:

A to B to C to D = 1 to 0.01 through 10 to 0 through 0.2 to 0 through 0.15.

A catalyst with this composition is used for the reduction of oxygen-containing and ammonia-containing gas mixtures in the temperature range from 150° to 550° C. and at space velocity of 300–100,000 $h^{-1}$.

These catalysts can be made by processes that are known in the art. However, these processes must always assure that the components (A) and (B) and optionally also (C) are obtained as an intimate mixture in the form of their respective oxides. The following are mentioned as typical examples of such production methods:
1a: homogeneous solution method;
1b: coprecipitation method;
2: simultaneous use of solution and precipitation methods;
3: precipitate-mixing method.

As preliminary stages or precursors of the components (A), (B), and (C), one uses solutions and/or precipitates, such as, for example, hydroxides or water-containing gels which are mixed to form an intimate mixture and which are then subjected to calcination. In the process, the precursors are pyrolized and one gets the desired intimate mixture of the oxides of the components that are critical for catalysis. The calcination temperature should be between 300° and 800° C. Below 300° C. one cannot obtain an intimate mixture of the oxides and thus an active catalyst; above 800° C., sintering takes place and that leads to the loss of the effective catalyst surface.

By way of an initial starting material for titanium as component (A), there can be employed, for example, various titanic acids, titanium hydroxide, and various titanium salts, such as halogenides, titanium sulfate, titanyl sulfate, and the like. Organic components of titanium, for example, titanalkoxides can also be used as initial material for titanium. Titanium oxide cannot be used in the calcined rutile or anatase form.

A further improvement of these catalyst production methods, described in German Patent Application 24 58 868, constitutes the basis of the catalyst material described in German Patent 35 31 809. Titanium dioxide is used as initial material for the preparation of this catalyst mass and this titanium dioxide is ground together with vanadium oxide and one or more oxides of the elements tungsten, molybdenum, phosphorus, chrome, copper, iron, and uranium. Afterward it is subjected to at least one thermal treatment step. Here, tungsten and molybdenum are completely or partly replaced by phosphorus in the form of its oxides or phosphates. Eccentric disk mills and annular chamber mills are preferred as mills. Calcination takes place in the temperature range from 200° to 900° C.

In all of the hitherto known catalysts of this kind, it is essential to make sure that the components (A) and (B) (for example, A=Ti; B=W, Mo etc.) are present as an intimate mixture in the form of their oxides. This mixture is then subjected to a shaping process from which one can obtain the catalysts by pressing or extruding in the form of bulk material or monoliths in honeycomb form.

As a result, the steps of catalyst shaping, for example, extrusion shaping, must be preceded by a process aimed at the formation of the intimate mixture as initial material. This currently customary procedure entails the following disadvantages;

technically expensive, multi-stage, energy-intensive procedural steps are necessary;
the production of the intimate mixture according to German Patent Application 24 58 888 is an environmental hazard; air exhaust and waste water problems appear;

the operation of mills for grinding activation is energy-intensive and demands expensive noise protection measures and dust protection installations;

the pre-treatment process steps for the formation of the intimate mixture are a serious, negative cost factor in catalyst production.

SUMMARY OF THE INVENTION

An object of the present invention is to save procedural steps when making so-called full catalysts (which consist of catalytically active mass throughout) for the selective reduction of nitrous oxides in oxygen-containing waste gases in the presence of ammonia. More particularly, the purpose of the invention is to achieve a major simplification of the process known heretofore and thus also achieve a definite cost reduction in catalyst production. Moreover, the invention facilitates direct and finely graduated control of catalyst properties through process control.

In attaining the above and other objects, one feature of the invention resides in a selection of certain titanium oxide materials and processing them in the course of a kneading procedure. The elimination of the conventional measures for the procurement of an intimate oxide mixture is thereby achieved.

In one aspect, the present invention resides in a new catalyst for selective reduction of nitrous oxide with ammonia, comprising the following components:
(A) titanium oxide;
($B_1$) at least one oxide of tungsten, silicon, boron, aluminum, phosphorus, zirconium, barium, yttrium, lanthanum, cerium and
($B_2$) at least one oxide of vanadium, niobium, molybdenum, iron, copper,
with an atomic ratio between the elements of components (A) and (B) ranging from 1:0.001 to 1:1, and preferably 1:0.002 to 1:0.4.

To obtain this catalyst, the present invention provides a new process wherein the component (A), is used in the form of a reactive, high-surface titanium oxide, with a BET (Brunauer, Emmett, and Teller method) surface of 40-500, preferably 50-300, and especially 75-150 $m^2/g$, which is present completely or predominantly in the anatase modification. Then component (A), together with components ($B_1$) and ($B_2$), preferably their preliminary stages, with the addition of the usual conventional additives, customary for the pressing or extrusion of ceramic masses, moistening agents, stabilizing media, binders, shaping aids, and optionally pore formers, are all intensively kneaded together. The kneading is carried out to form a homogeneous kneaded mass. The kneaded mass is then extruded to form and obtain molded bodies that are then dried by slowly raising the temperature up to a maximum of 60° C. Thereafter, the molded bodies are calcined by gradually raising the temperature, in ambient air, to a final temperature in the range of 300°-800° C.

According to further, more detailed aspects of the invention, the initial material for components ($B_1$) and ($B_2$), are used in the form of hydroxides, oxides, salts or heteropoly acids or their salts, preferably ammonium salts.

Reaction conditions can vary but it is preferred that the component (A) and the component ($B_1$) are mixed in the kneader at a pH of 7-11, especially 8-10. Generally, they are pre-kneaded dry to a residual moisture of 3-12, preferably 5-10% by weight, before the component ($B_2$) is added.

In a still more detailed aspect of the invention, the dry, pre-kneaded mixture of components (A) and ($B_1$) are precalcined at temperatures of 400°-700° C. before component ($B_2$) is added.

Generally, the mass, consisting of components (A), ($B_1$) and ($B_2$), are precalcined at 300-800, preferably 400°14 700° C., before it is kneaded into a homogeneous kneaded mass.

It is advantageous that the components ($B_1$) and ($B_2$) are used in the form of a heteropoly acid, respectively, one of its salts, preferably the ammonium salts, whereby the metals, contained in the heteropoly acid, from groups ($B_1$) and ($B_2$), are present in the atomic ratio ranging from 12:1 up to 1:12.

As mentioned above, the process can be carried out by initially withholding the starting material for the component ($B_2$) from the kneading process. Then it is introduced in the form of a salt or a heteropoly acid or one of its salts, preferably the ammonium salts, in an aqueous solution, through impregnation, upon the preferably calcined preliminary catalyst stage consisting of components (A) and ($B_1$).

Suitable titanium oxides are reactive, large-surface titanium oxides with a specific surface according to BET of 40-500 $m^2/g$ which are present completely or predominantly in the form of anatase. These materials can be commercial products made by means of precipitation or flame hydrolysis. The usually highly-dispersed products, in addition to the large specific surface, have a very tight grain spectrum with an average size of the primary particles on the order of magnitude of 30 nm.

The individual elements of Group (B) can be used, for example, in the form of the following initial starting components: tungsten oxide, ammonium para- or metatungstate, silicon dioxide, silicon tungstic acid, silica, boric oxide, boric acid, aluminum oxide, phosphorus oxide, ammonium phosphate, phosphotungstic acid, phosphomolybdic acid, zirconium dioxide, zirconium phosphate, barium oxide, yttrium oxide, lanthanum oxide, ceracetate, cernitrate, ceroxide, borotungstic acid, vanadium oxide, vanadyloxalate, ammonium-metavanadate, vanado-tungstic acids, vanado-molybdic acids, vanado-phospho-molybdic acids, phospho-vanadium acid, niobooxyhydrate, nioboxalate, niobo-vanadium acids, ammonium-molybdate, molybdenum oxide, iron oxide, iron phosphate, iron hydroxide, organic iron salts, such as iron oxalate, copper acetate, copper (II) oxide, Cu-, Ce-, La-containing heteropoly acids, and the like.

The substances mentioned can be used in the form of solutions or also as solid substances.

When making the full catalysts according to the invention, the customary additive substances, well known in the art to contribute their expected function, can be added in addition to the actual catalyst mass.

As moistening agents desalinated water, aqueous ammonia solution, monoethanolamine and alcohols can be used.

As supporting substances these can be used, for example, glass fibers of various size.

As binders, which give the paste to be made sufficient stability after shaping in the state of the so-called green body, cellulose derivatives, such as, for example, carboxymethylcellulose or also unsubstituted celluloses are suitable.

In addition, polyethylene, polypropylene, polyvinylalcohol, polyethyleneoxide, polyacrylamide, or polystyrene can be used as binders.

To facilitate the pressing action or to improve the extrusion capability, there can be added shaping and/or sliding aids, such as, for example, bentonite, clay earths, organic acids, paraffin, waxes, silicon oils.

Finally, the porosity (pore volume, pore distribution) of the full catalysts can also be adjusted in a target-oriented manner by adding suitable pore forming agents. Such substances, for example, are fine-particle carbons or mechanical wood pulp, which burn out at the calcination temperatures to be applied.

According to the process, kneaded assemblies and apparatus are used for the intensive kneading of the initial materials to form a homogeneous kneading mass. Here, preference is given to kneaders with sigma or masticator scoops. The use of a certain titanium oxide, according to the invention, in conjunction with an intensive kneading process, for the preparation of the catalyst mass, will offer considerable advantages compared to the hitherto customary production method. For example, technically expensive, environmentally hazardous, and therefore also expensive process steps can be eliminated. Coprecipitation and grinding processes for the preparation of an intimate oxide mixture can also be dropped. This leads to a definite cost reduction of production and at the same time eliminates dependence on expensively produced initial materials.

In addition, a target-oriented adjustment of shrinkage—a decisive parameter for the rupture formation tendency and fracture resistance of full catalysts—is possible through the use of suitable initial materials and through adaptation of the kneading process in terms of intensity, temperature, and time, including tempering steps interspersed therebetween.

Furthermore, the new catalyst production method provides a more direct and simultaneously more flexible control of catalyst properties by saving several process steps. For example, by selecting a suitable stabilizer component from the series ($B_1$), one can improve the sintering resistance of the catalysts. This can be recognized by the fact that the BET surface of the finished catalyst, which is at a high level, remains almost constant during practical operation and that the temperature induced phase conversion of the titanium dioxide is suppressed by the anatase modification into the rutile modification. These properties will directly result in definitely longer service life of the catalyst that are obtainable according to the present invention.

DETAILED DESCRIPTION OF THE INVENTION

Figure 1:
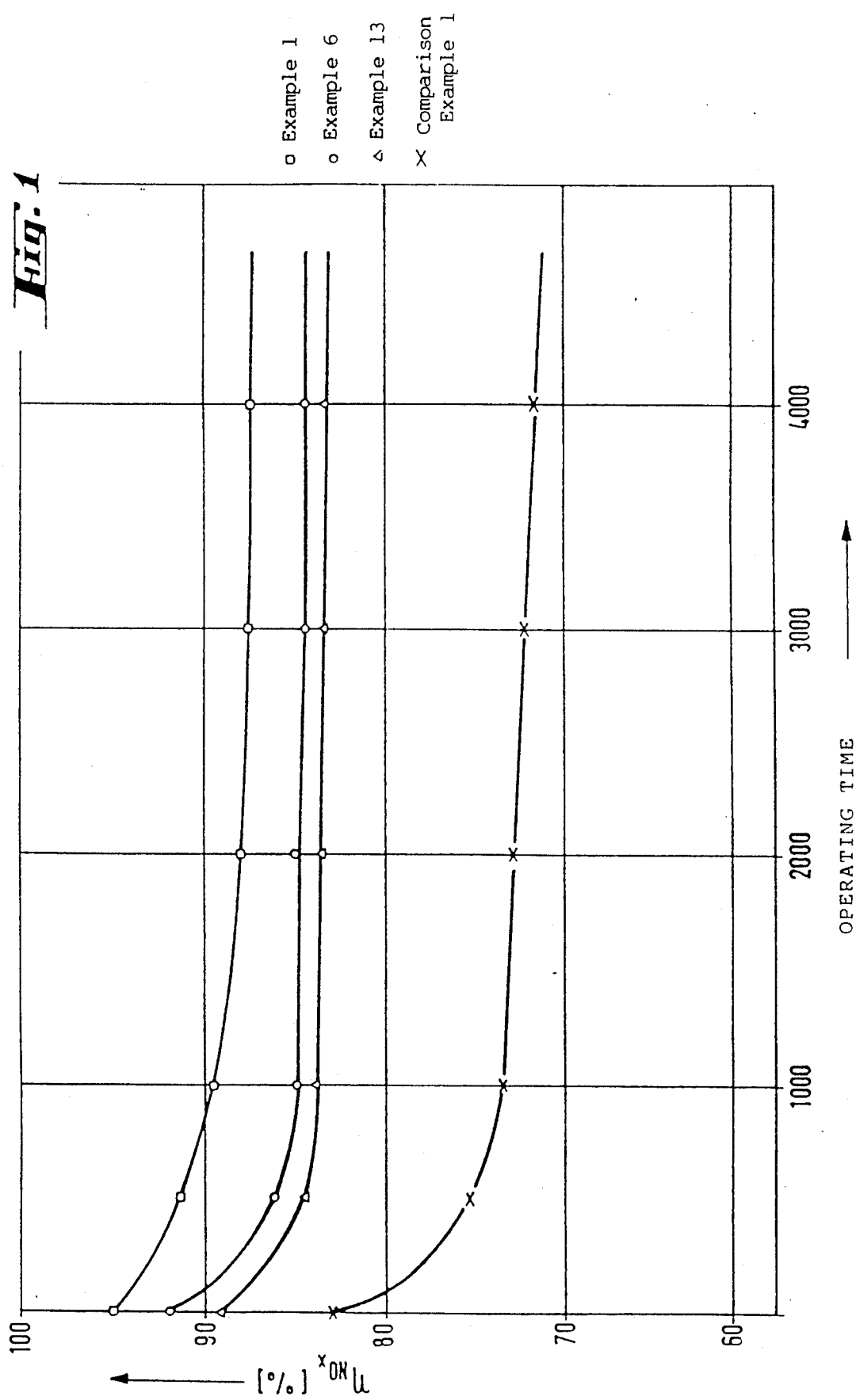
FIG. 1 (for Example 13) illustrates the reduction of activity decline during long-time utilization in flue gases from bituminous coal dry furnaces with operating temperatures above 300° C., if $SiO_2$ is used as stabilizer in the catalyst.

By way of the physical-chemical properties of the initial materials ($TiO_2$-anatase, stabilizers from the Series $B_1$, activators from the Series $B_2$), and through the selection of further additives and processing in the kneader according to the invention one can, in a given kneading mass, by means of empirical variation of the moisture content of the same during the kneading process, control the pore volume and the pore radii distribution. The pore radii distribution can be varied within wide limits in the meso-pore and macro-pore ranges, whereby mono-, bi-, and trimodal pore radii distributions as well as transition forms between them can be adjusted in a target-oriented manner. The correct selection of these parameters lead to a considerable increase in catalytic activity. Pore distribution and the pore volume however also decisively influence the poisoning resistance and thus directly the catalyst life times.

In this connection, the pK value of the solid surface assumes special weight. The pK value can change quite considerably in the catalyst according to the invention by virtue of the selection of the stabilizers or activators. Here we must especially mention the use of heteropoly acids as activators and/or stabilizers. Interestingly enough, it was found that especially catalysts, which are made from these materials, when used in the particularly problematical flue gases from bituminous coal slag tap furnaces, for example, compared to catalysts according to German Patent 24 58 888, reveal a definitely lesser tendency toward the enrichment of arsenic and other distrubing substances (catalyst poisons). This can be traced back to the increased poisoning resistance as a result of reduced heavy metal adsorption along the surface of the catalyst. As a result, the use of catalysts is facilitated in "high-dust operation" of bituminous coal slag tap furnaces with technically meaningful life times. The known comparison catalysts on the other hand are subject to rapid deactivation which is caused primarily by heavy metals present in the flue gas.

The invention will be explained below in greater detail with regard to the illustrative examples.

Catalysts were tested both in dust-free model waste gases in a laboratory test installation and in the waste gas of an oil furnace system. Besides, long term tests were performed in the flue gas from a bituminous coal dry furnace.

The catalyst tests were performed in the temperature range from 200° to 500° C. The space velocities here were between 10,000 and 40,000 $h^{-1}$. In each case we used the molar ratio, which was found to be favorable, between the reduction agent ammonia and the nitrous oxide amounting to 0.6–1.6, preferably 0.8–1.2.

COMPARISON EXAMPLE 35 kg of an intimate mixture of the oxides $TiO_2$ and $WO_3$, made according to German Patent 24 58 888, in a weight ratio of 9:1 are mixed with 20 liters of desalinated water, 6 kg 15% by weight of aqueous $NH_3$ solution, 1.8 kg monoethanolamine, and with a solution of ammonium metavanadate corresponding to 350 g $V_2O_5$. The mixture is kneaded intensively at varying moisture content and temperatures between 70° and 90° C. Then, in succession, we add 620 g $SiO_2$, 1.4 kg alkali-free clay, and 3.5 kg glass fibers (length 1–8 mm). The mixture is kneaded into a homogeneous kneaded mass for 6–8 hours, whereby, for the purpose of adjusting the plasticity necessary for subsequent shaping, we add an additional 410 g polyethylene oxide, 410 g of carboxymethylcellulose, 230 g lactic acid and 11.5 kg of fully-desalinated water.

With the help of an extruder, the catalyst mass is then extruded into monolithic honeycomb bodies with channels having a quadratic cross-section (cell division: 3.4 mm or 7.4 mm). c The molded bodies are dried in an environmental drying chamber at rising temperature in the range from 20° to 60° C. and they are then calcined after step-by-step raising of the temperature for 24 hours at 620° C.

EXAMPLES 1–9

The composition of the catalyst is indicated in each case in Table 1. Basically the procedure as follows was used to compare the catalysts:

35 kg of the $TiO_2$-anatase mentioned in claim 1, with a BET surface of 98 $m^2/g$ are mixed with 4.4 kg ammonium paratungstenate (APW), 22 liters of desalinated water, 7.5 kg of 15% by weight aqueous $NH_3$ solution, 1.8 kg monoethanolamine, and a solution of ammonium metavanadate, corresponding to 390 g $V_2O_5$. Amid intensive kneading in the temperature range from 60° to 90° C., there is added, in succession, 670 g $SiO_2$, 2.5 kg glass fibers (length 1–8 mm), and 1.5 kg of alkali-free clay. The mixture is kneaded into a homogeneous kneaded mass for 5–7 hours (Werner & Pfleiderer Kneader LUK 2.5); to adjust the plasticity, an additional 450 g polyethylene oxide, 450 g carboxymethyl-cellulose, 250 g lactic acid, and 12.3 liters of desalinated water were put into the mixture. For the fine adjustment of the moisture content and the plasticity of the kneaded mass, it was necessary to add more ammonia water prior to the end of the kneading operation. Using an extruder, the catalyst mass was pressed into monolithic honeycomb bodies with channels having a quadratic cross-section (cell division: 3.4 mm). After drying amid temperature rising from 20° to 60° C. in an environmental drying chamber, the molded bodies are calcined for 24 hours at 620° C. after gradual raising of the temperature.

In Examples 6–9, there was added, instead of $TiO_2$, anatase or ammonium paratungstenate (APW) or ammonium metavanadate (AMV)—flame-hydrolytically produced $TiO_2$-P-25 (Degussa) or tungsten oxide, boron oxide, or $Nb_2O_5$, the latter inserted as nioboxalate, dissolved in water.

TABLE 1

| Ex. | Component A | Component $B_1$ | Weight ratio, A-oxide/$B_1$-oxide | Component $B_2$ | share of $B_2$ oxide in g/100 g A − $B_1$ mixing oxide |
|---|---|---|---|---|---|
| 1 | Anatase | APW | 9:1 | AMV | 1.0 |
| 2 | Anatase | APW | 9.5:0.5 | AMV | 1.0 |
| 3 | Anatase | APW | 9.9:0.1 | AMV | 1.0 |
| 4 | Anatase | APW | 9:1 | AMV | 0.5 |
| 5 | Anatase | APW | 9:1 | AMV | 3.0 |
| 6 | Anatase | $WO_3$ | 9:1 | AMV | 1.0 |
| 7 | P-25 | $WO_3$ | 9:1 | AMV | 1.0 |
| 8 | Anatase | $B_2O_3$ | 9.7:0.3 | AMV | 1.0 |
| 9 | Anatase | APW | 9:1 | $Nb_2(C_2O_4)_5$ | 2.5 |

EXAMPLES 10–13

35 kg of $TiO_2$-anatase, mentioned in claim 1, with a BET surface of 75 $m^2/g$, are mixed, in the running kneader, with 4.4 kg ammonium paratungstenate (APW) and 10 kg of 15% by weight aqueous $NH_3$ solution. The suspension thus obtained is kneaded at 80° C. for 3 hours until it is dry (residual moisture 5–10% by weight). Then the mixture thus obtained is mixed with 22 liters of desalinated water, 75 kg of 15% by weight aqueous $NH_3$ solution, 1.8 kg monoethanolamine, and with a solution of ammonium metavanadate (AMV) corresponding to 390 g $V_2O_5$. This mass is further processed as described in Examples 1–9 and is extruded to form the same honeycomb bodies. The monoliths are dried and calcined likewise in a manner similar to the method described in Examples 1–9.

In Example 11, according to Table 2, the ammonium metavanadate was replaced with ammonium molybdate (AM); in Examples 12 and 13, the ammonium paratungstenate was replaced with BaO or $SiO_2$.

TABLE 2

| Ex. | Component A | Component $B_1$ | Weight ratio, A-oxide/$B_1$-oxide | Component $B_2$ | share of $B_2$ oxide in g/100 g A − $B_1$ mixing oxide |
|---|---|---|---|---|---|
| 10 | Anatase | APW | 9:1 | AMV | 1.0 |
| 11 | Anatase | APW | 9:1 | AM | 3.0 |
| 12 | Anatase | BaO | 9.5:0.5 | AMV | 1.0 |
| 13 | Anatase | $SiO_2$ | 9:1 | AMV | 1.0 |

EXAMPLES 14–17

35 kg of $TiO_2$-anatase, mentioned in claim 1, with a BET surface of 40 $m^2/g$, are mixed with 4.0 kg aluminum oxide and 12 kg 15% by weight aqueous $NH_3$ solution. The paste is kneaded at 80° C. for 2–3 hours up to a residual moisture of between 5 and 10% by weight. Then the powder is precalcined for 2 hours at 400° C.

The precalcined oxide mixture is mixed in the kneader with 22 liters of desalinated water, 7.5 kg of 15% by weight aqueous $NH_3$ solution, 2.0 kg of monoethanolamine, 210 g of pulp (coarse-fibered cellulose) and only then is it mixed with a solution of ammonium metavanadate corresponding to 390 g $V_2O_5$. Amid intensive kneading at 60°–90° C., an additional 2.3 g of alkali-free clay, 2.2 g of glass fibers (length 1–8 mm), 200 kg polyethylene oxide, 200 kg carboxymethylcellulose, and 250 g lactic acid is added. The mixture is kneaded into a homogeneous kneaded mass for 5–7 hours whereby, to adjust the plasticity, more ammonia water was added. Using an extruder, the catalyst mass is finally pressed into honeycomb bodies with quadratically configured channels (cell subdivision: 7.4 mm). After drying with rising temperatures (20°–60° C.) in an environmental drying chamber, the molded bodies are calcined for 24 hours at 700° C. after gradual raising of the temperature.

In Examples 15–17, we added, instead of aluminum oxide according to Table 3, ammonium paratungstenate or lanthanum oxide and, in Example 16, instead of ammonium metavanadate, copper (II) acetate, dissolved in water was added.

TABLE 3

| Ex. | Component A | Component $B_1$ | Weight ratio, A-oxide/$B_1$-oxide | Component $B_2$ | share of $B_2$ oxide in g/100 g A − $B_1$ mixing oxide |
|---|---|---|---|---|---|
| 14 | Anatase | $Al_2O_3$ | 9:1 | AMV | 1.0 |
| 15 | Anatase | APW | 9:1 | AMV | 1.0 |
| 16 | Anatase | APW | 9.5:0.5 | $Cu(CH_3COO)_2$ | 1.5 |

TABLE 3-continued

| Ex. | Component A | Component B₁ | Weight ratio, A-oxide/B₁-oxide | Component B₂ | share of B₂ oxide in g/100 g A – B₁ mixing oxide |
|---|---|---|---|---|---|
| 17 | Anatase | La₂O₃ | 9.5:0.5 | AMV | 1.0 |

EXAMPLES 18-21

35 kg of TiO₂-anatase, mentioned in claim 1, with a BET surface of 280 m²/g, are mixed with 4.0 kg of zirconium oxide, 390 g V₂O₅, and 15 kg of 15% by weight aqueous NH₃ solution. The thin-flowing paste is kneaded at 80° C. for 2-4 hours up to a residual moisture of 5-10% by weight. The dry powder is then precalcined for 2 hours at 700° C.

The precalcined mixture is mixed with 25 kg of fully desalinated water, 7.5 kg of 15% by weight NH₃ solution, and 2.0 kg of monoethanolamine and it is then further processed similar to Examples 1-9. The finished catalyst mass is extruded to form honeycomb bodies as in Examples 14-17.

In Examples 19-21, according to Table 4, zirconium dioxide was replaced by ammonium paratungstenate or phosphorus pentoxide and in Example 20, V₂O₅ was replaced by iron (III) oxide.

TABLE 4

| Ex. | Component A | Component B₁ | Weight ratio, A-oxide/B₁-oxide | Component B₂ | share of B₂ oxide in g/100 g A – B₁ mixing oxide |
|---|---|---|---|---|---|
| 18 | Anatase | ZrO₂ | 9:1 | V₂O₅ | 1.0 |
| 19 | Anatase | APW | 9:1 | V₂O₅ | 1.0 |
| 20 | Anatase | APW | 9:1 | Fe₂O₃ | 1.0 |
| 21 | Anatase | P₂O₅ | 9.5:0.5 | V₂O₅ | 1.0 |

EXAMPLES 22-26

35 kg of TiO₂-anatase, mentioned in claim 1, with a BET surface of 98 m²/g, are mixed with 422 g of ammonium-2-hydrogen-12-vanadophosphate and with 28 liters of desalinated water.

The mass is kneaded intensively at a temperature of 40°-70° C., and an additional 670 g SiO₂, 2.5 g glass fibers (length 1-8 mm), and 6.0 kg of alkali-free clay was put in. To adjust the plasticity, there was added 450 g polyethylene oxide, 900 kg carboxymethylcellulose, 250 g lactic acid, and 15 liters of desalinated water.

The mixture is kneaded into a homogeneous kneading mass for 5-7 hours and is processed into honeycomb bodies according to Examples 1-9.

According to Table 5, in Examples 23-26, ammonium-2-hydrogen-12-vanadophosphate was replaced by the following heteropoly acids:

TABLE 5

| Ex. | Component A | Components B₁ + B₂ | A-oxide/B₂-oxide |
|---|---|---|---|
| 22 | Anatase | (NH₄)₅H₂[P(V₁₂O₃₆)] | 9.99:0.01 |
| 23 | Anatase | (NH₄)₈[V₆W₆O₃₇] | 9.9:0.1 |
| 24 | Anatase | H₄[P(Mo₁₁VO₄₀)] | 9.9:0.01 |
| 25 | Anatase | H₆[P(Mo₉V₃O₄₀)] | 9.99:0.01 |
| 26 | Anatase | (NH₄)₆H[P(Mo₁₁CuO₄₀)] | 9.99:0.01 |

EXAMPLES 27-31

35 kg of TiO₂-anatase, mentioned in claim 1, with a BET surface of 98 m²/g, are mixed with 4.3 kg of ammonium paratungstenate, 22 liters of desalinated water, 7.5 kg of 15% by weight aqueous NH₃ solution, and 1.8 kg of monoethanolamine. The mass is provided with additives (plastifier, stabilizing media, etc.) in accordance with examples 1-9; it is kneaded intensively (2-7 hours at 60°-90° C.) and it is extruded into honeycomb bodies which here are considered as preliminary catalyst step. These bodies are then dried and calcined in a manner similar to examples 1-9; after cooling (according to claim 7), with 1.0 g vanadiumpentoxide per 100 g of titanium dioxide/tungstic oxide mixture, they are then brought up in a volume of water corresponding to the water receiving capacity of the honeycomb body and this is done by means of impregnation with a solution of ammonium-2-hydrogen-12-vanadophosphate. Drying is accomplished in an air flow at 150° C. and subsequent tempering is done for 2 hours at 400° C.

In Examples 28-31, there was used—in place of ammonium paratungstenate or ammonium-2-hydrogen-12-vanadophosphate, according to the quantity ratios given in Table 6—ammonium metatungstenate, yttriumoxide, zircon dioxide, or silicon dioxide or V₂O₅ (as aqueous solutions of vanadiumoxalate), ammonium-6-tungstenate-6-vanadate or 11-molybdo-1-vanadophosphoric acid.

TABLE 6

| Ex. | Component A | Component B₁ | Weight ratio, A-oxide/B₁-oxide | Component B₂ | share of B₂ oxide in g/100 g A – B₁ mixing oxide |
|---|---|---|---|---|---|
| 27 | Anatase | APW | 9:1 | (NH₄)₅H₂[P(V₁₂O₃₆)] | 1.0 |
| 28 | Anatase | AMW | 9:1 | V₂(C₂O₄)₅ | 1.0 |
| 29 | Anatase | Y₂O₃ | 9.8:0.2 | V₂(C₂O₄)₅ | 1.0 |
| 30 | Anatase | ZrO₂ | 9:1 | (NH₄)₈[V₆W₆O₃₇] | 1.0 |
| 31 | Anatase | SiO₂ | 9:1 | H₄[P(MO₁₁VO₄₀)] | 1.0 |

TESTING THE CATALYSTS THAT WERE PRODUCED

The catalysts prepared according to Examples 1-31, were tested in the exhaust gas from an oil furnace which was adjusted according to the test conditions given below by means of the additional dosing of additional noxious-substance components (NO$_x$ and SO₂) and of ammonia required for nitrous oxide reduction.

| Test Conditions: | | |
|---|---|---|
| Waste gas composition: | NO$_x$ | 800 ppm |

-continued

| Test Conditions: | |
|---|---|
| NH$_3$ | 800 ppm |
| SO$_2$ | 500 ppm |
| O$_2$ | 5.0% by vol. |
| H$_2$O | 11.0% by vol. |
| CO$_2$ | 12.0% by vol. |
| N$_2$ | residue |

Figure 2:
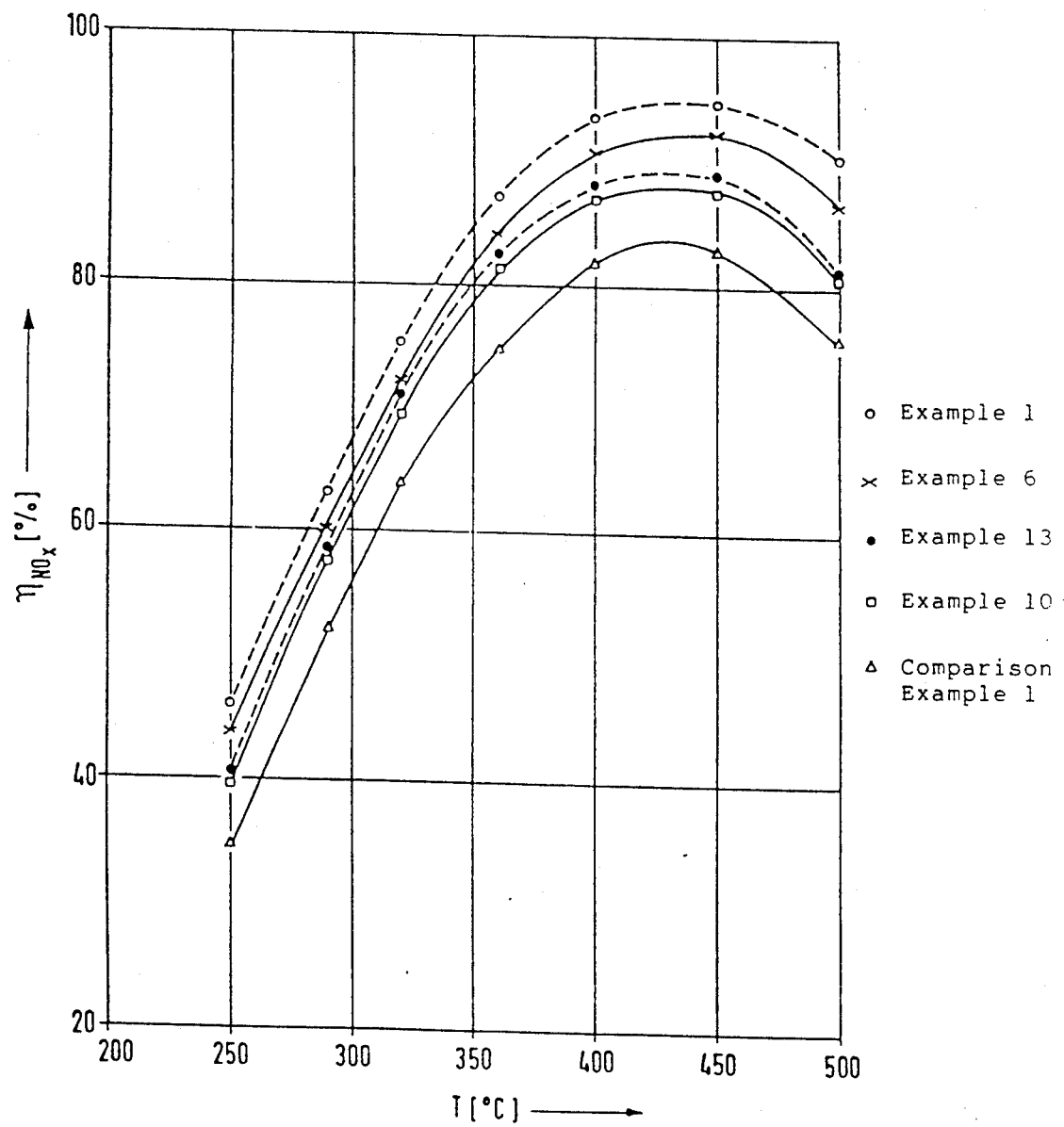
FIG. 2 and FIG. 3 show the surprisingly great activity increase of catalyst according to the invention compared to a conventional catalyst made according to Comparison Example 1.
Figure 3:
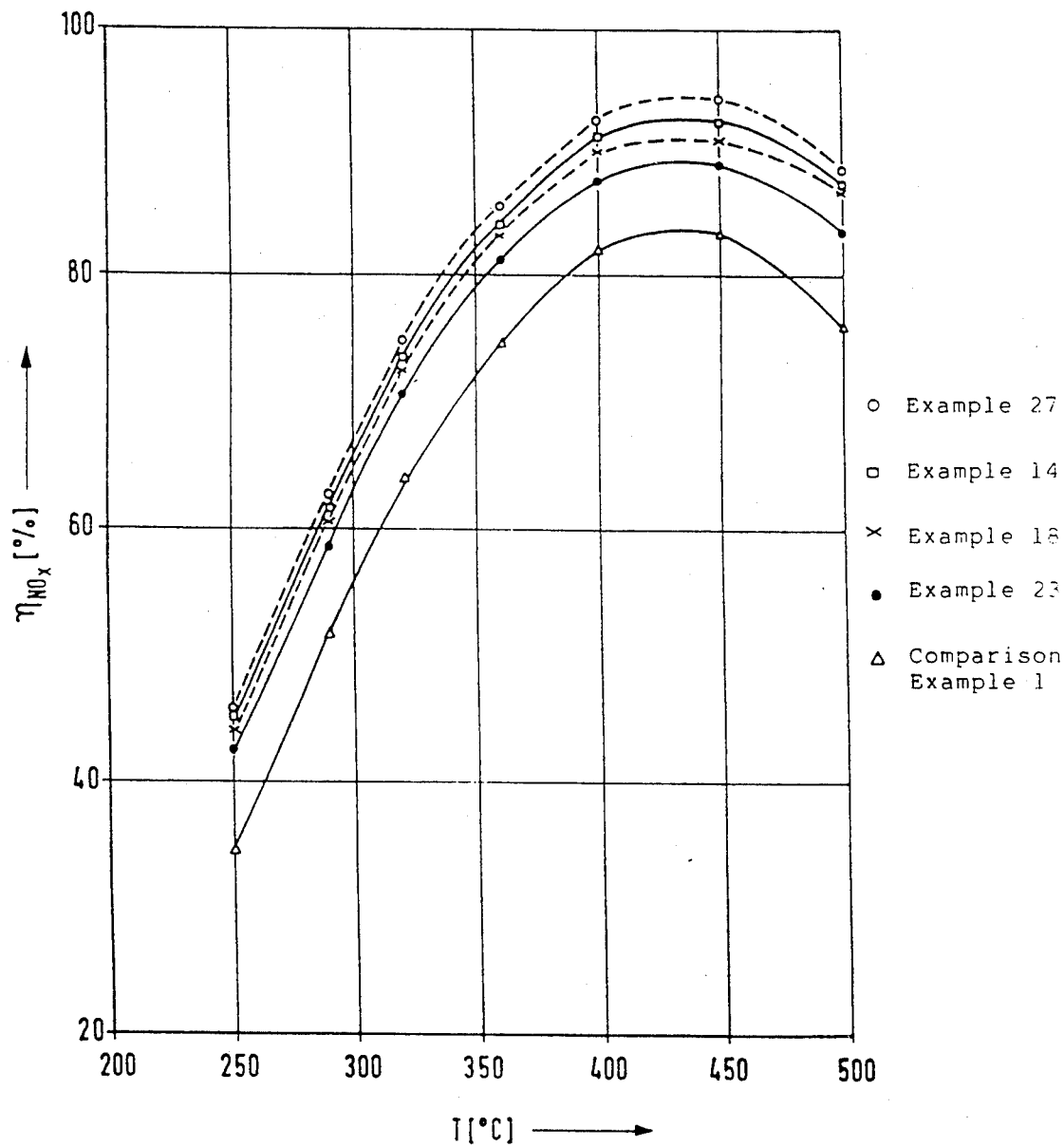

The catalyst tests were performed in the temperature range of 250°-500° C. and at a space velocity of 20,000 h$^1$. Selected results of the measurements as well as long-term tests in bituminous coal dry furnaces, under the conditions mentioned earlier, are illustrated in the graphs in FIGS. 1, 2, and 3. The measurement values that constitute the foundation are compiled in Tables 7 and 8.

TABLE 7*

| T/Ex. No. | 1 | 6 | 10 | 13 | 14 | 18 | 23 | 27 | Comparison sample |
|---|---|---|---|---|---|---|---|---|---|
| 250 | 46.0 | 43.8 | 39.5 | 40.5 | 45.2 | 44.2 | 42.5 | 45.8 | 34.5 |
| 290 | 63.1 | 60.1 | 57.5 | 58.5 | 62.7 | 60.5 | 67.6 | 62.7 | 52.0 |
| 320 | 75.7 | 72.2 | 69.4 | 71.1 | 73.6 | 72.5 | 70.7 | 74.9 | 63.9 |
| 360 | 86.0 | 84.1 | 81.3 | 82.6 | 84.0 | 83.0 | 81.1 | 85.4 | 74.7 |
| 400 | 93.4 | 90.6 | 87.0 | 88.2 | 91.5 | 89.9 | 87.5 | 92.7 | 81.8 |
| 450 | 94.3 | 92.3 | 87.8 | 89.0 | 92.4 | 91.1 | 88.4 | 94.0 | 83.1 |
| 500 | 90.4 | 86.6 | 80.8 | 81.5 | 87.5 | 86.6 | 83.3 | 88.5 | 76.0 |

*The values given are NO$_x$ conversions ($\eta$NO$_x$) in percent related to the NO$_x$ initial concentration.

TABLE 8*

| | SK-TF (T = 450° C.) | | | |
|---|---|---|---|---|
| | Examples | | | Comparison sample |
| t[H] | 1 | 6 | 13 | [test] |
| Zero measurement | 95 | 92 | 89 | 83 |
| 500 | 91.5 | 86 | 84.5 | 75.5 |
| 1000 | 89.5 | 85 | 83.5 | 73.5 |
| 2000 | 88 | 85 | 83.5 | 73 |
| 3000 | 88 | 84.5 | 83.5 | 72.5 |
| 4000 | 87.5 | 84.5 | 83.5 | 71.5 |

*The values given are NO$_x$ conversions ($\eta$NO$_x$) in percent, related to the initial NO$_x$ concentration.

Further variations of the present invention will become apparent to those skilled in the art and are intended to be encompassed by the appended claims.

German priority document P 37 06 136.1 is relied on and incorporated herein.

We claim:

1. A process for producing a catalyst for selective reduction of nitrous oxide with ammonia, comprising the following components:
   (A) titanium oxide;
   (B$_1$) at least one oxide of tungsten, silicon, boron, aluminum, phosphorus, zirconium, barium, yttrium, lanthanum, and cerium, and
   (B$_2$) at least one oxide of vanadium, niobium, molybdenum, iron, and copper, with an atomic ratio between the elements of components (A) and (B) ranging from about 1:0.001 to 1:1, the process comprising:
   intensively prekneading together component (A), in the form of a reactive, high-surface titanium oxide, with a BET surface of 40-500 m$^2$/g, which is present completely or predominantly in the anatase modification, with component (B$_1$), and after prekneading, adding component (B$_2$) and kneading so as to form a homogeneous kneaded mass, extruding said kneaded mass to form a molded body, drying the molded body while slowly raising the temperature up to a maximum of about 60° C., and calcining with the gradual raising the temperature, in ambient air, at final temperatures in the range of about 300°-800° C.

2. The process according to claim 1, further comprising adding at least one of the following: a moistening aid, a stabilizer, a binder, a shaping aid, or a pore former.

3. The process according to claim 1, further comprising introducing components (B$_1$) and (B$_2$) in the form of a hydroxide, an oxide, or a heteropoly acid or their salts.

4. The process according to claim 1, wherein the atomic ratio between the elements of components (A) and (B) is in the range of about 1:0.002 to 1:0.04.

5. The process of claim 3 further comprising introducing component (B$_1$) or component (B$_2$) as an ammonium salt.

6. The process of claim 1, wherein the BET surface is about 50 to 300 m$^2$/g.

7. The process of claim 1, wherein the BET surface is about 75 to 150 m$^2$/g.

8. The process according to claim 1, further comprising pre-kneading component (A) and component (B$_1$) to a residual moisture of about 3-12%, and thereafter adding component (B$_2$).

9. The process according to claim 8, wherein the pH of the mixture of component (A) and component (B$_1$) is about 7 to 11.

10. The process according to claim 8, wherein the pH of the mixture of component (A) and component (B$_1$) is about 8 to 10.

11. The process according to claim 8, wherein the residual moisture of the mixture of component (A) and (B$_1$) after prekneading is about 5 to 10% by weight.

12. The process according to claim 1, further comprising precalcining the pre-kneaded mixture of components (A) and (B$_1$) at a temperature in the range of about 400°-700° C. before adding component (B$_2$).

13. The process according to claim 1, further comprising including components (B$_1$) and (B$_2$) in the form of a heteropoly acid or one of its salts, whereby the metals, contained in the heteropoly acid, from groups (B$_1$) and (B$_2$), are present in the atomic ratio ranging from about 12:1 up to 1:12.

14. The process according to claim 1, wherein the initial material for the component (B$_2$) remains withdrawn from the kneading process and then introducing component (B$_2$) in the form of a salt or a heteropoly acid or one of its salts, in an aqueous solution, through impregnation, into a preliminary catalyst stage containing components (A) and (B$_1$).

* * * * *